United States Patent [19]
Sekowski et al.

[11] Patent Number: 6,052,190
[45] Date of Patent: *Apr. 18, 2000

[54] HIGHLY ACCURATE THREE-DIMENSIONAL SURFACE DIGITIZING SYSTEM AND METHODS

[75] Inventors: Marek Sekowski, Tarzana, Calif.; Thomas Summers, Los Lunas; James M. Hardy, Albuquerque, both of N.Mex.

[73] Assignee: Utoptics, Inc., Tarzana, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,628

[22] Filed: Sep. 9, 1997

[51] Int. Cl.⁷ ..................................................... G01B 11/24
[52] U.S. Cl. ............................................ 356/376; 356/5.11
[58] Field of Search ..................................... 356/5.1, 5.11, 356/5.12, 5.13, 376

[56] References Cited

U.S. PATENT DOCUMENTS

| | | |
|---|---|---|
| 3,619,058 | 11/1971 | Hewlett et al. . |
| 3,649,123 | 3/1972 | Ulicki . |
| 3,730,628 | 5/1973 | Wolcott et al. ......................... 356/5.11 |
| 3,778,159 | 12/1973 | Hines et al. . |
| 3,778,160 | 12/1973 | Wolcott . |
| 4,005,936 | 2/1977 | Redman et al. . |
| 4,163,954 | 8/1979 | Hayes . |
| 4,165,936 | 8/1979 | Eisenring et al. . |
| 4,537,502 | 8/1985 | Miller et al. . |
| 4,594,000 | 6/1986 | Falk et al. . |
| 4,639,129 | 1/1987 | Hullein et al. . |
| 4,743,110 | 5/1988 | Arnaud et al. . |
| 4,895,441 | 1/1990 | Allen, Jr. . |
| 4,942,561 | 7/1990 | Ohishi et al. . |
| 4,957,365 | 9/1990 | Brinkmeyer . |
| 5,029,999 | 7/1991 | Kremer et al. . |
| 5,114,226 | 5/1992 | Goodwin et al. . |
| 5,164,733 | 11/1992 | Nettleton et al. . |
| 5,194,906 | 3/1993 | Kimura et al. . |
| 5,241,360 | 8/1993 | Key et al. . |
| 5,262,836 | 11/1993 | Nourrcier . |
| 5,285,252 | 2/1994 | Vareille et al. . |
| 5,534,992 | 7/1996 | Takeshima et al. ..................... 356/5.1 |
| 5,737,085 | 4/1998 | Zollars et al. ........................... 356/376 |
| 5,790,242 | 8/1998 | Stern et al. . |
| 5,831,719 | 11/1998 | Berg et al. . |

OTHER PUBLICATIONS

The Frequency–Modulated Laser Tank Guage: Designing a Practical System; *Sensors*, Sep. 1996; pp. 16–26.
The Technology Behind 3D Digitizing; *Computer Graphics World;* Mar. 1997; pp. 47–52.

*Primary Examiner*—Richard A. Rosenberger
*Attorney, Agent, or Firm*—Oppenheimer Wolff & Donnelly LLP

[57] ABSTRACT

A distance-measuring system includes a light source for transmitting a beam of light to a target, thereby generating a received beam. A calibration unit periodically calibrates the system by positioning a calibration target between the light source and the target so that the transmitted beam is interrupted, thereby generating a received calibration beam. The calibration unit also generates a calibration signal which is indicative of when the calibration target is generating the received calibration beam. A target sensor receives the reflected target and calibration beams and provides a target signal indicative of the reflected target and calibration beams. A reference sensor receives light from the light source and provides a reference signal to the processing circuitry. Processing circuitry receives the calibration, target, and reference signals and calculates the distance to the target based upon the target and reference signals and/or calibrates the system based upon the calibration signal. The processing circuitry may provide data based upon the calibration and target signals to a computer for distance calculations and calibration. A beam splitter may be provided between the light source and the target to allow the transmitted beam to be incident on the target while deflecting the received beam to be incident on the target sensor, so that the light transmitted to the target and reflected back to the target sensor is substantially coaxial.

11 Claims, 11 Drawing Sheets

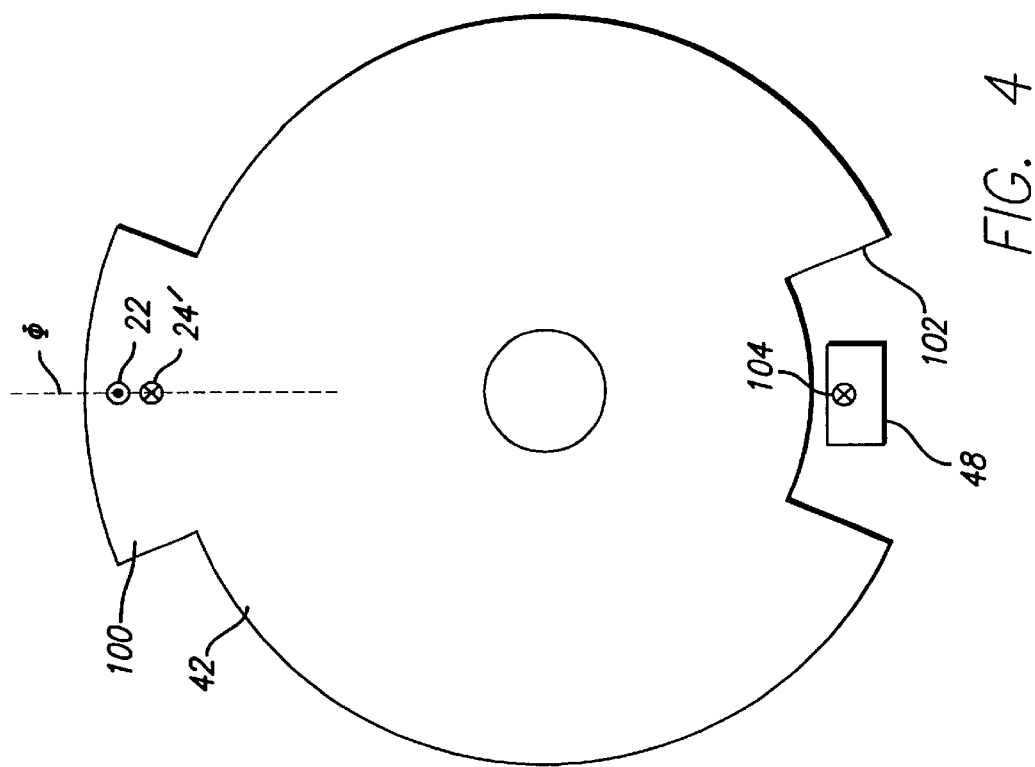
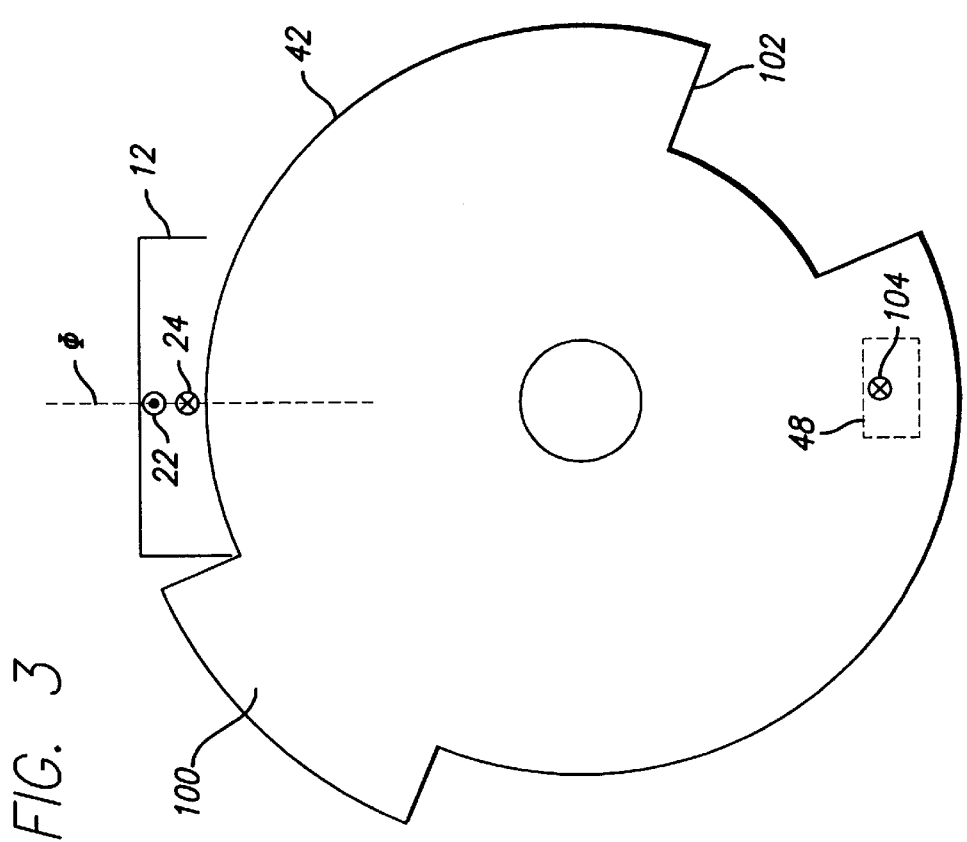

HIGHLY ACCURATE THREE-DIMENSIONAL SURFACE DIGITIZING SYSTEM AND METHODS

FIELD OF THE INVENTION

The present invention relates to methods and apparatus for measuring distances optically. The present invention also relates to methods and apparatus for digitizing three-dimensional surfaces.

BACKGROUND OF THE INVENTION

Three-dimensional object digitizing has many applications. Automobile and aircraft designers use such technology to convert prototypes into computer model data. The data may then be used to determine the accuracy of the prototype with respect to the design, to ensure quality control during production, and so on.

Three-dimensional digitizers fall into two categories: contact and non-contact systems. Most contact systems employ either manually operated probes or automatic coordinate measuring machines (CMMs). These contact systems collect data one point at a time. Clearly, contact systems are neither practical nor economical for large-scale modeling projects such as automobiles or aircraft.

Non-contact systems employ optical techniques to obtain data, for example, lasers, moire interferometry, and patterned light. Laser digitizers illuminate either a small spot or a thin line of light (which is more than 100 times faster than the small spot illumination) on the surface of an object. A technique known as triangulation is then used to determine the location of points in three-dimensional space. Systems based on moire interferometry or patterned light can quickly capture a set of data consisting of 50,000 to 100,000 points.

Not every system is suitable for every candidate for three-dimensional digitization. There are a large number of factors that can affect the quality of the digitization, including the color and surface finish of the object, the shape of the inside and outside corners and edges of the object, the existence of holes and concavities in the object, and whether the object is inanimate or alive (e.g., a human). All of these factors make it difficult to develop systems that meet specific market requirements.

The utilization of a digitizer requires the generation and collection of data and the subsequent processing of the data. The collected data (in the form of coordinate points) produce what is known as a data cloud or a data explosion because of the potentially millions of bits of data. The data cloud is generated arbitrarily without any sensitivity to the surface topology of the object being scanned and digitized because of inherent limitations in the data-generating device. The data cloud is collected into a computer file, typically a very large and cumbersome computer file.

At this point, the data cloud does not represent any practical value. Accordingly, the user needs to perform rigorous and time-consuming work in order to translate the data cloud into a meaningful file format which represents the surface and the features of the scanned object. In processing the data cloud, the user attempts to extract the surface features (such as edges, depressions, circles, etc.) from the data cloud, which extraction facilitates data manipulation, including scaling, mirror imaging, tool path generation, finite element analysis, metamorphic transitions, optical special effects, and so on. This manipulation and extraction of surface features from the data cloud is one of the technological bottlenecks in the industry, one on which much time and effort has been centered for improvement.

The majority of conventional digitizers generate and collect data through one form or another of a technique known as triangulation. Referring to FIG. 14, triangulation is a technique that relies on the Pythagorean Theorem. A right triangle is defined by a calibrated distance A between a laser and a sensor, a transmitted laser beam B, and a received beam C. Triangulation techniques suffer from a number of drawbacks. For example, a "shadow" in the data may be produced if the received beam C is obstructed. Additionally, in order to produce accurate measurements, an angle θ between the transmitted beam B and the received beam C must be at least 30 degrees; accordingly, the physical dimensions of the moving scanning head and of the digitizer are functions of the size of the object being digitized. For example, if the digitized object has a two-foot-deep surface depression in its topography, the size of the triangulating probe will have to be approximately 16 inches. Such a large probe increases the mass of the scanning device and, therefore, the risk of mechanical instabilities for which exists a constant need to calibrate the scanner.

Turning to range finders in general, one of the most common in use today is police radar range-finders. Modern police radar range-finders use semiconductor lasers (as opposed to radar previously) to project a beam of light from which a measurement is derived. The devices may use the frequency shift (i.e., the Doppler effect) on modulation of the laser beam. Alternatively, the devices may transmit short pulses of light and measure the changing time of return of the pulse from which velocity of the target is calculated. Neither approach is able to provided highly accurate distances.

Other conventional range finders include the Geodimeter™ which is an electro-optical device that measures distance on the basis of the velocity of light. The approach used in a Geodimeter is to send out fixed frequency modulated light beams that are retroreflected back to the instrument where the variable phase of the return signal is measured to calculate distance. This has been the standard conventional approach to measure distance: sending out a fixed frequency signal and measuring the phase of the return signal.

In view of the above-mentioned drawbacks of conventional apparatus, it is an object of the present invention to provide methods and apparatus for measuring distance and/or digitizing objects which mitigate and/or obviate these drawbacks.

It is another object of the present invention to provide methods and apparatus which eliminate the limitations of existing scanning and range-finding devices.

It is a further object of the present invention to provide apparatus for measuring distance that is relatively small and portable.

It is still another object of the present invention to provide methods and apparatus for digitizing objects which are able to digitize an object in a matter of seconds rather than hours or days with conventional devices.

It is yet another object of the present invention to provide a distance-measuring apparatus which is significantly less expensive and, therefore, more widely applicable than conventional systems.

It is still a further object of the present invention to provide methods and apparatus for distance measuring in which optical signals for generating and collecting data are transmitted to and received from a target coaxially.

It is another object of the present invention to provide methods and apparatus for digitizing objects which significantly reduce the number of data points required to describe features of an object accurately.

It is yet a further object of the present invention to provide methods and apparatus for distance measuring and/or digitizing objects which perform data manipulation (e.g., curve fitting) on-the-fly. Accordingly, rather than generating a data cloud, a mathematical representation of data is output, which representation is user definable.

It is another object of the present invention to provide methods and apparatus for digitizing objects which do not require a coherent (i.e., single frequency) source of light, thereby eliminating the need for a retroreflector used in interferometry techniques. Accordingly, the present invention is able to measure objects with a wide range of surface qualities, eliminates the need for troublesome target-instrument mechanical alignment, solves shadowing problems, and removes the limits for distance measurements without increasing the size of the measuring device.

It is a further object of the present invention to provide methods and apparatus for digitizing and close-range distance measuring which provide highly accurate and absolute measurements for real-time quality control applications. Accordingly, the present invention may be integrated into manufacturing processes as one tool in the tool library of a computerized numerically controlled (CNC) milling machine. Such integration allows precision manufacturers (e.g., aerospace companies) to certify parts without removing the parts from the bed of the machine, thereby significantly increasing the speed of the manufacturing process.

It is still another object of the present invention to provide methods and apparatus for distance measuring and/or object digitizing which may be implemented in a multiple scanning-head system in which the multiple scanning heads are stationary. Accordingly, digitizing installations implementing the principles of the present invention are able to digitize large objects, for example, automobiles or airplane wings, in a matter of seconds and objects of any shape or configuration. Significant savings over conventional scanning systems are realized in hardware, manpower, and time.

SUMMARY OF THE INVENTION

The present invention provides methods and apparatus which can measure intermediate-range distances (e.g., less than 50 feet) with a precision on the order of 0.001 inch. The methods and apparatus of the invention are able to measure distance affordably and quickly. Upon measuring distance to the surface of an object, the present invention is then able to take this distance data and digitize the object with a level of accuracy and precision and speed unattainable by conventional practices.

According to one aspect of the present invention, a method for measuring distance to an object involves transmitting a modulated laser beam to a target at a known frequency. A reflected beam is received from the target and the frequency is adjusted to meet specific conditions. The frequency at which the transmitted beam is modulated is then varied until there is a second specific phase difference between the transmitted beam and the reflected beam. Distance to the target is then calculated from the two modulation frequencies.

According to one aspect of the invention, a distance-measuring includes an adjustable frequency generator for generating a modulation frequency. A light source is connected to the frequency generator and transmits a beam of light to the target at the modulation frequency. A target sensor receives a beam reflected from the target which has a reflected frequency. A phase detector connected to the frequency generator and the target sensor receives the modulation frequency and the reflected frequency, and then provides an output which is indicative of a phase angle between the modulation frequency and the reflected frequency. A computer connected to the phase detector and the frequency generator adjusts the modulation frequency until a zero phase difference exists between the modulation frequency and the reflected frequency. Accordingly, rather than providing a fixed reference frequency and measuring phase as in conventional devices, the present invention varies a modulation frequency until a zero phase difference exists. This method of measuring distance is much easier and more accurate than conventional methodology.

According to a further aspect of the present invention, the distance-measuring system may also include a beam splitter disposed or positioned between the light source and the target. The beam splitter allows the transmitted beam to be incident on the target while deflecting the received beam to be incident on the target sensor. Accordingly, the light transmitted to the target and reflected back to the target sensor is substantially coaxial. Such a coaxial system eliminates any need for conventional triangulation techniques and all inherent drawbacks associated therewith. This coaxial feature of the present invention also allows the entire distance-measuring system to be implemented on a small scale, significantly smaller than conventional systems.

According to another aspect of the present invention, an apparatus for measuring distance to a target includes a light source for transmitting a beam of light to a target at a modulation frequency. An adjustable frequency generator connected to the light source generates the modulation frequency. A target sensor receiving a beam reflected from the target at a particular reflected frequency. The apparatus also includes a phase detector connected to the frequency generator and the target sensor for receiving the modulation frequency and the reflected frequency. The phase detector provides an output which is indicative of a phase angle between the modulation frequency and the reflected frequency. From this phase angle determination, the distance to the target may be calculated. The phase detector preferably has a plurality of outputs, each of which is indicative of a phase angle which is a respective multiple of 90 degrees.

The frequency generator may include an input for receiving a frequency-adjusting signal for adjusting the modulation frequency to yield a phase angle of a multiple of 90 degrees between the adjusted modulation frequency of the transmitted beam and the reflected frequency of the reflected beam. The distance to the target may be calculated by determining the frequency which yields zero crossings of the reflected frequency with respect to the modulation frequency. Zero crossings are easily determined because the slope of the frequency at the zero crossings is at a maximum. Accordingly, the distance calculation is quickly and accurately carried out.

Further objects, advantages, and features of the present invention will become apparent to those skilled in the art from a reading of the following detailed description with appropriate reference to the accompanying drawings.

BRIEF DESCRIPTION OF THE DRAWINGS

FIG. 3 is a schematic diagram of an exemplary embodiment of a calibration unit of a distance-measuring system of the present invention, showing a normal mode;

FIG. 4 is a schematic diagram similar to that of FIG. 3, showing a calibration mode;

DETAILED DESCRIPTION OF PREFERRED EMBODIMENTS

The distance-measuring and/or object-digitizing principles of the present invention may be implemented in a variety of embodiments. However, to exemplify these principles, two preferred embodiments of the present invention are provided. Generally speaking, the distance-measuring systems of the invention generate and collect data coaxially which eliminates the need for conventional triangulation techniques.

FIRST EXEMPLARY EMBODIMENT

Figure 1:
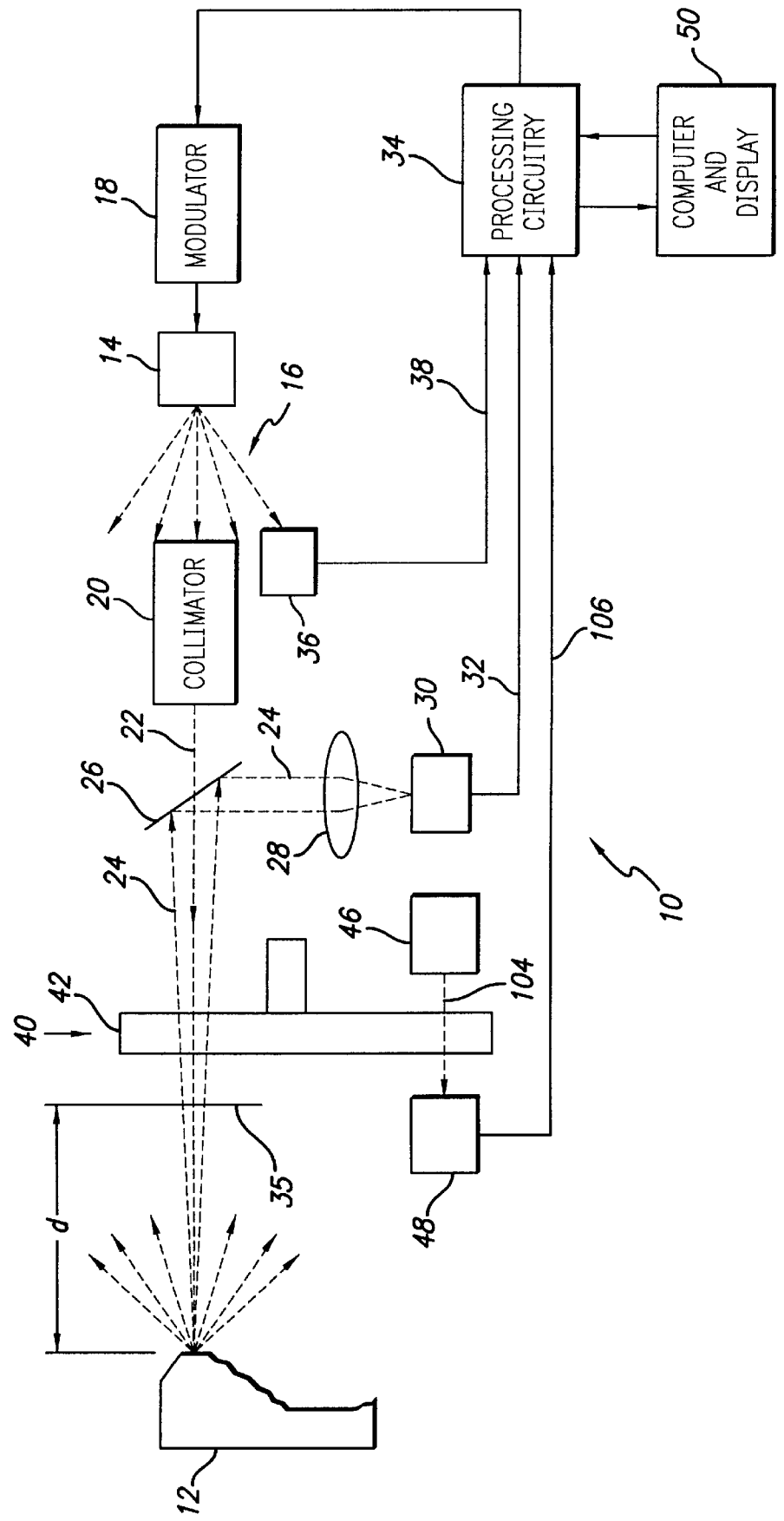
FIG. 1 is a schematic diagram of an exemplary embodiment of a distance-measuring system in accordance with the present invention.

With reference to FIG. 1, a distance-measuring system 10 in accordance with the present invention measures a distance d to the surface of a target 12. The distance-measuring system 10 includes an optical source 14, such as a laser diode, which emits light 16. The optical source 14 is preferably controlled by a modulator 18 so that light 16 is modulated with a sinusoid at a fixed frequency. Light 16 is then received by a collimator 20 which collimates light 16 into a transmitted beam 22 which is transmitted to the target 12. Transmitted beam 22 is reflected off of the surface of the target 12 and scattered. A portion of the scattered light is reflected back to the system 10 in a received beam 24. Received beam 24 is reflected off of a beam splitter or mirror 26 and focused by a lens 28 onto a target sensor 30. Target sensor 30 provides a target signal 32 to an input of processing circuitry 34. Target signal 32 is indicative of received beam 24 from the target 12 and has a target phase. An aperture 35 may be provided to minimize random scattered light and/or environmental radiation from being incident on the mirror 26 and affecting target signal 32.

A portion of light 16 from the optical source 14 is incident on a reference sensor 36 which provides a reference signal 38. Reference signal 38 is indicative of light 16 emitted by the light source 14 and has a reference phase. Distance d to the target 12 is computed by the processing circuitry 34 as a function of the target phase of target signal 32 minus the reference phase of reference signal 38, plus a distance calibration variable, which will be discussed in detail below.

The distance-measuring system 10 preferably includes a calibration unit 40 which periodically calibrates the system 10. According to a preferred embodiment, the calibration unit 40 includes a calibration target 42, a motor 44 for driving the target 42, a calibration light source 46, and a calibration sensor 48. Details of the operation of the calibration unit 40 will be discussed below. A computer 50, such as a personal computer, may be interfaced with the processing circuitry 34 for control and display functions, particularly in object digitizing applications, which will also be discussed below.

Figure 2:
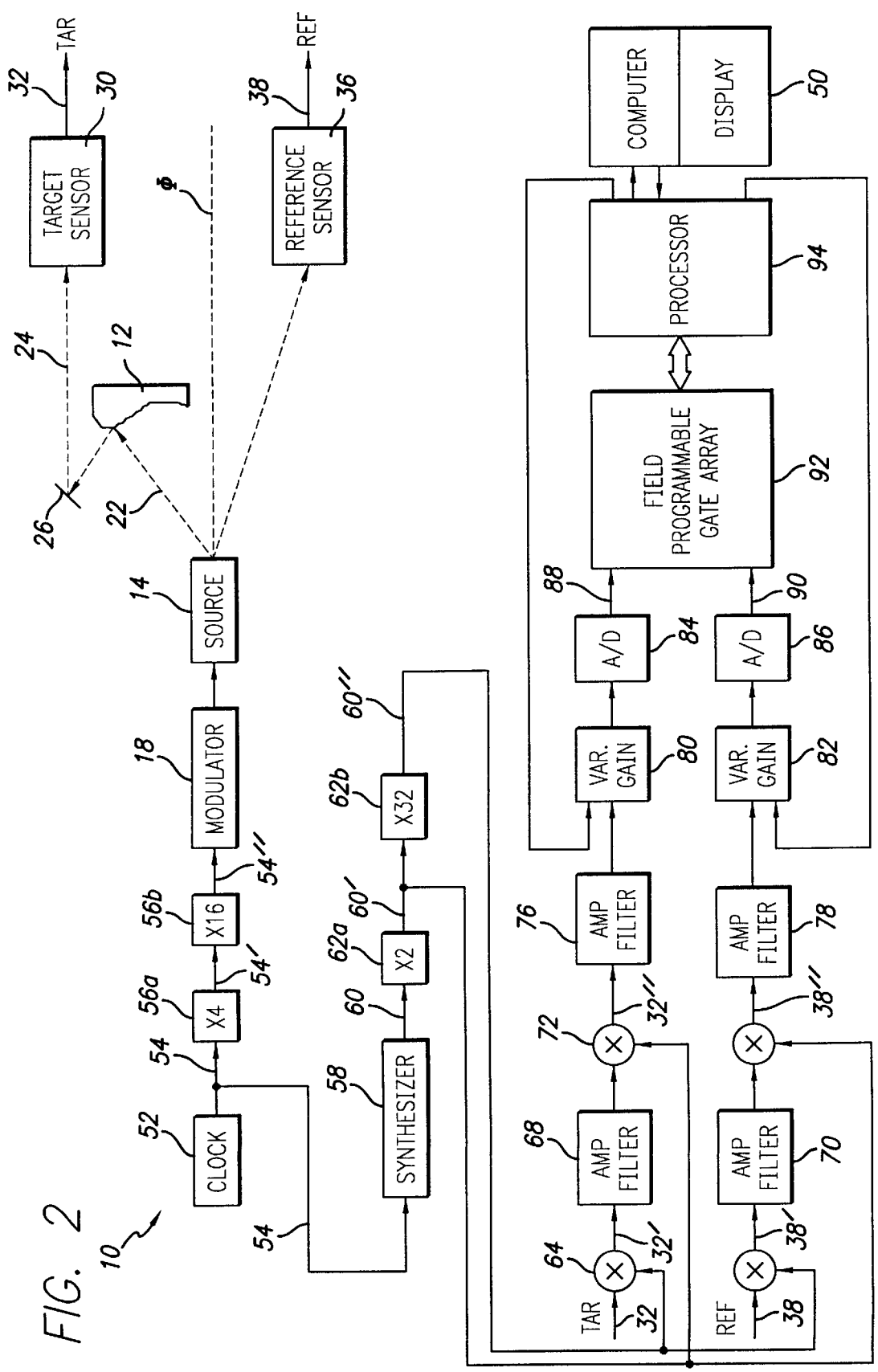
FIG. 2 is a schematic diagram of the distance-measuring system of FIG. 1 shown in detail.

With additional reference to FIG. 2, a more detailed illustration of the exemplary embodiment of the present invention is shown. The processing circuitry 34 controls the modulation of transmitted beam 22 and processes target and reference signals 32 and 38. The processing circuitry 34 then provides data to the computer 50 for further processing, e.g., digitizing applications. The processing circuitry 34 includes a clock 52 for providing a clock signal 54 having a predetermined frequency.

The frequency at which transmitted beam 22 is modulated is selected so that the distance-measuring system 10 generates and collects data as fast as possible while still maintaining a high degree of accuracy. It has been determined that if transmitted beam 22 has a frequency greater than about 1,500 MHz, then the operation of the various components of the system may become uncertain, and that it may be difficult to maintain the linearity of the system. Therefore, in accordance with a preferred embodiment of the present invention, a frequency less than 1,500 MHz, for example, 600 MHz, is selected for transmitted beam 22. By modulating transmitted beam 22 at such a frequency, the distance-measuring system 10 is able to make more than 1,000 measurements per second.

In order to modulate transmitted beam 22 at about 600 MHz, the frequency of clock signal 54 is selected so as to provide a stable and non-fluctuating clock signal 54, for example, 10 MHz. Clock signal 54 is preferably multiplied by frequency multiplier 56 to yield the desired frequency. In the illustrated preferred embodiment, two frequency multipliers 56a, 56b having factors of 4 and 16, respectively, multiply clock signal 54 to provide a frequency-multiplied clock signal 54" having a frequency of 640 MHz, which is provided to the modulator 18 and then to the optical source 14.

Other factors may come into play when selecting a desired modulation frequency. Errors in the measurements of the distance-measuring system 10 are measured in fractions of a cycle of the modulated frequency of transmitted beam 22. Accordingly, the wavelength of the modulated transmitted beam 22 should be as short as possible and limited only by the current market components available for the optical source 14 (e.g., a laser diode) and/or the sensors 30 and 36 (e.g., photo diodes). Further, the amplitude of the modulated transmitted beam 22 should be as large as possible and consistent with maintaining the sinusoidal deviation on the order of one percent. In other words, the slope of the modulated transmitted signal 22 at the zero crossings should be maintained within one percent of the slope of a sinusoid of the same peak amplitude.

Clock signal 54 is also provided to a synthesizer 58 which outputs a processing signal 60. The frequency of processing signal 60 is multiplied by frequency multipliers 62a, 62b. Multiplied processing signal 60″ is provided to a pair of multipliers 64, 66. Multiplier 64 multiplies target signal 32 from the target sensor 30 with processing signal 60″, and multiplier 66 multiplies reference signal 38 from the reference sensor 36 with processing signal 60″. Multipliers 64 and 66 then provide multiplied target and reference signals 32′ and 38′ to respective amplifier/filters 68 and 70. Multipliers 64, 66 and filters 68, 70 respectively comprise mixers which carry out frequency translations of the modulated target and reference signals 32, 38. The mixed target and reference signals 32′, 38′ are then respectively mixed with signal 60′ at the processing frequency by multipliers 72, 74 and amplifier/filters 76, 78. Target and reference signals 32″, 38″ are then input into variable gain amplifiers 80, 82 and, subsequently, into analog-to-digital (A/D) converters 84, 86. The A/D converters 84, 86 respectively provide digitized target and reference signals 88, 90 to a field programmable gate array 92 which interfaces with a processor 94 which, in turn, interfaces with the personal computer 50.

With further reference to FIG. 1, details of the calibration unit 40 are now provided. As mentioned above, the calibration unit 40 periodically calibrates the system 10. The calibration target 42 intermittently or selectively interrupts transmitted beam 22 from the collimator 20 (or optical source 14). This interruption is preferably carried out by configuring the calibration target 42 as illustrated in FIGS. 3 and 4, which shows a projection 100 and a notch 102 formed in the calibration target 42. As shown in FIG. 3, under normal operation when the system 10 is generating and collecting data, the calibration target 42 is positioned so that transmitted and received beams 22 and 24 are able to pass the calibration target 42. (In FIGS. 3 and 4, transmitted and reflect beams 22 and 24 are shown offset, not coaxially, on a common optical axis φ as symbols ⊗ and ⊙, respectively, for clarity.) As shown in FIG. 4, when the system 10 is to be calibrated, the calibration target 42 rotates so that the projection 100 obstructs transmitted beam 22. Accordingly, there is no received beam 24 from the target 12; however, there is a received beam from the projection 100 itself (indicated by 24′), which is reflected back to the mirror 26 and on to the lens 28 and target sensor 30, which, in turn, outputs target signal 32.

In order to determine whether target signal 32 is indicative of received beam 24 from the target 12 or received beam 24′ from the calibration target 42, calibration sensor 48 provides a calibration signal 104 to the processing circuitry 34. Calibration signal 104 results from a calibration beam 104 provided by the calibration light source 46 passing through the notch 102 and being incident on calibration sensor 48 when the projection is obstructing transmitted beam 22. Upon receipt of calibration signal 104 from the calibration sensor 48, the processing circuitry 34 updates a distance calibration variable. Although any interval is possible, an interval for performing the calibration, including data gathering and computation, is preferably less than about one millisecond. This may be accomplished by rotating the calibration target 42 at about 1,200 revolutions per minute (RPMs) with the projection 100 being approximately 36° wide and the notch 102 being about 58° wide.

SECOND EXEMPLARY EMBODIMENT

Figure 5:
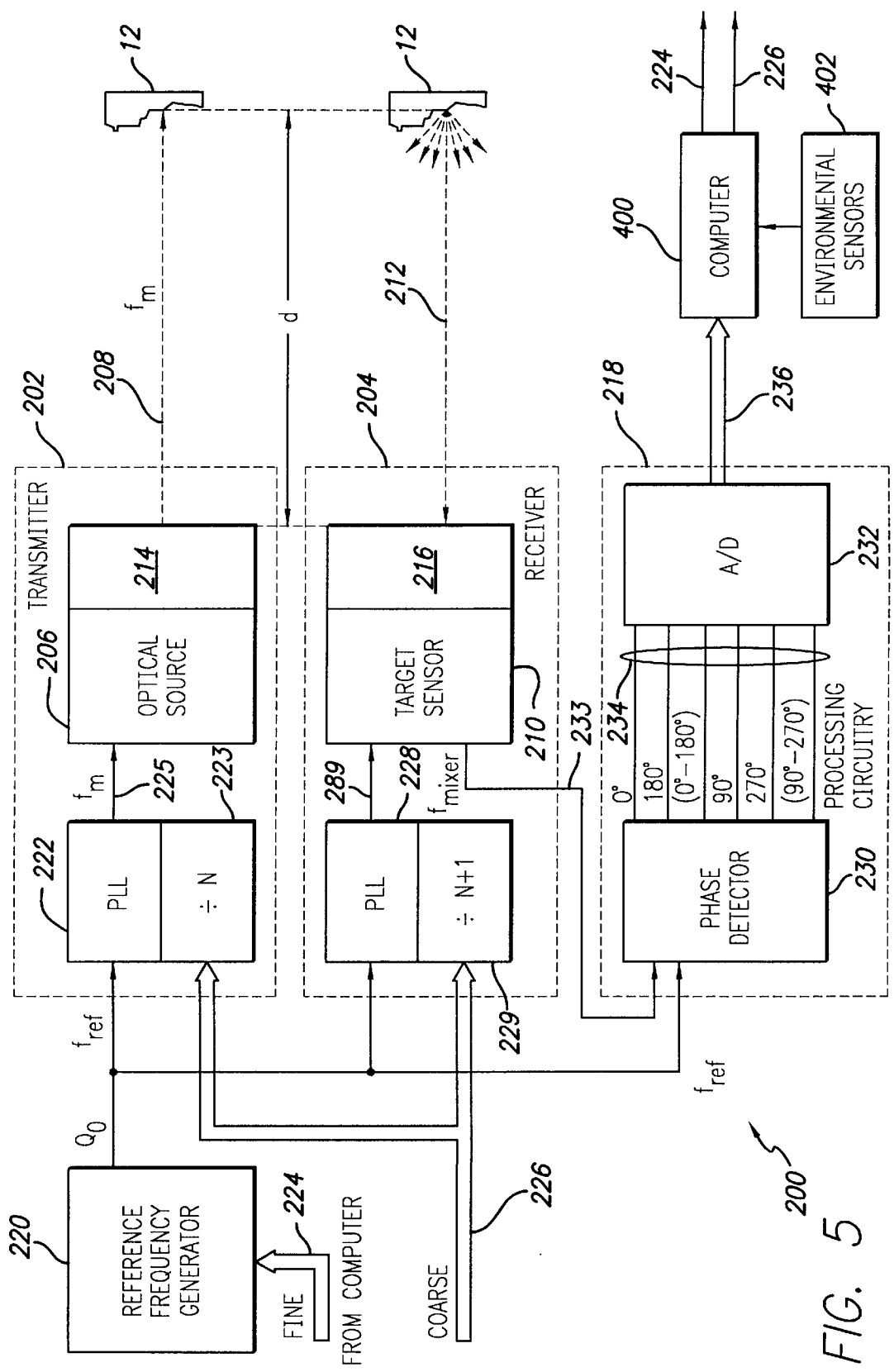
FIG. 5 is a schematic diagram of a distance-measuring system in accordance with another exemplary embodiment of the present invention.
Figure 6:
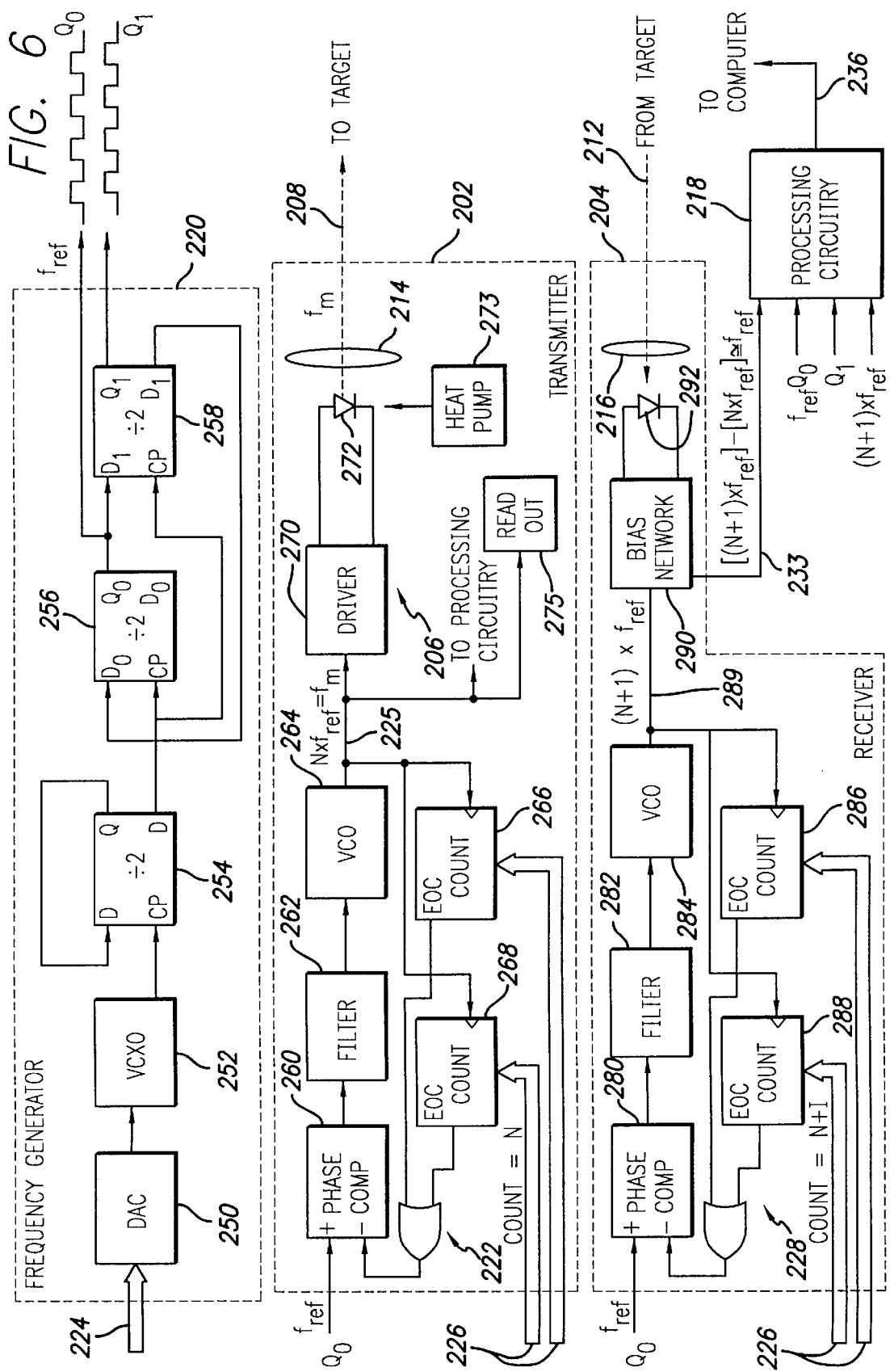
FIG. 6 is a schematic diagram illustrating the embodiment of the distance-measuring system shown in FIG. 5.
Figure 7:
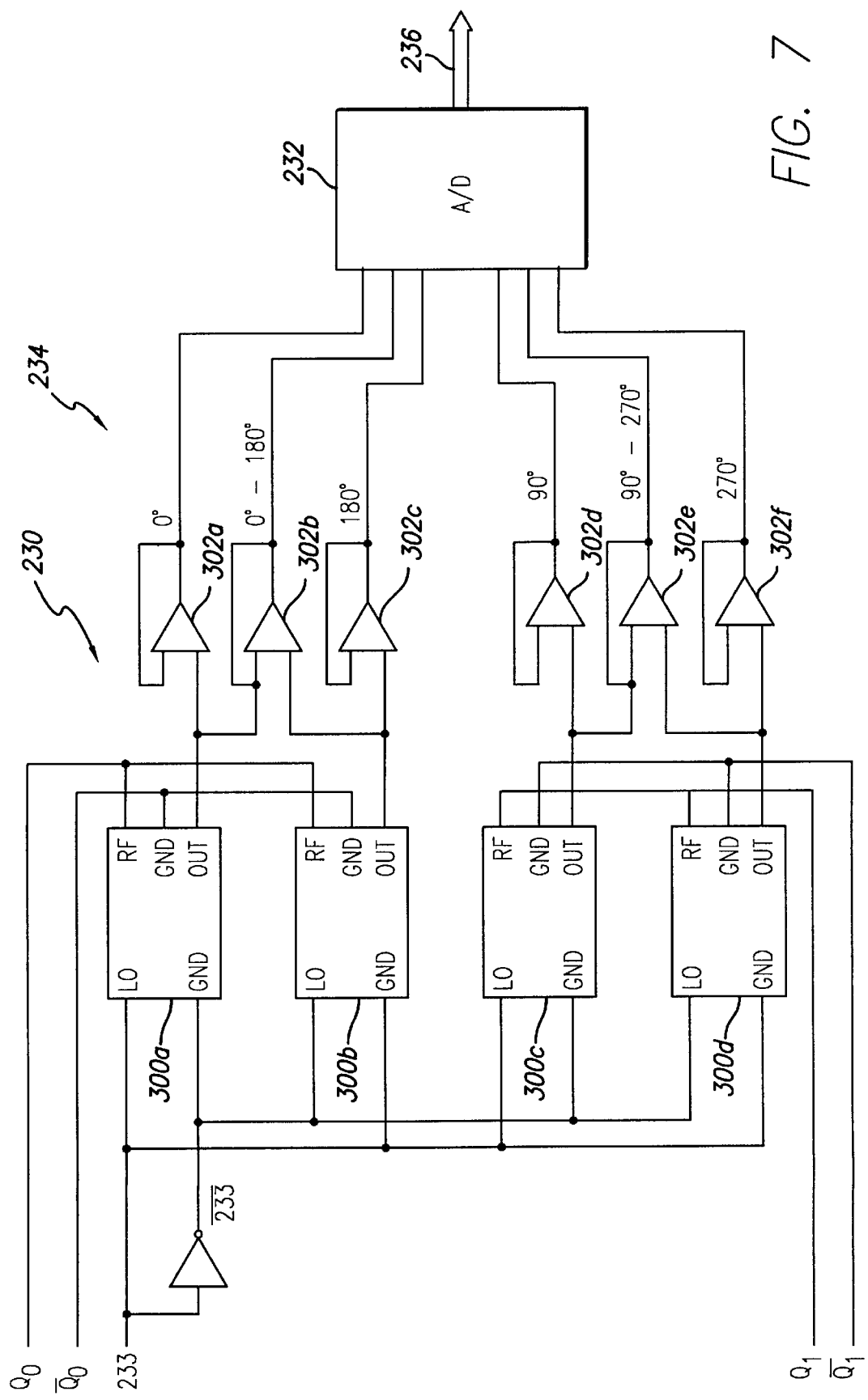
FIG. 7 is a schematic diagram illustrating a preferred embodiment of processing circuitry of the distance-measuring system shown in FIG. 5.

Another exemplary embodiment of the present invention is illustrated in FIGS. 5, 6, and 7. As in the embodiment described above, this embodiment of the distance-measuring system, indicated by reference numeral 200, coaxially transmits and receives light for the generation and collection of data at a rate up to about 10,000 samples per second and then calculates distance to a target with an accuracy of 0.001 inch. Although the system 200 may be designed for any range, for most industrial applications the operating range may be under about 50 feet and preferably between about 5 feet to 25 feet.

Referring specifically to FIG. 5, the distance-measuring system 200 includes a transmitter 202 and a receiver 204. The transmitter 202 includes an optical source 206 from which a small-diameter amplitude-modulated (AM) pulse train or beam 208 is emitted and transmitted to a target 12. The receiver 204 includes a target sensor 210 which receives a received beam 212 from the target 12. Although not illustrated as such in the figures for clarity, the optics of the transmitter 202 and the receiver 204, that is, transmitter optics 214 of the optical source 206 and receiver optics 216 of the target sensor 210, are preferably configured to be substantially coaxial. The receiver 204 is connected to processing circuitry 218.

Transmitted beam 208 is transmitted at a modulation frequency ($f_m$) which is generated, controlled, and varied by a reference frequency generator 220 and a phase-locked loop (PLL) 222. The frequency generator 220 receives a fine adjustment signal 224 from a computer 400 and provides a reference frequency ($f_{ref}$) to the PLL 222 of the transmitter 202. A divide-by-N counter 223 of the PLL 222 receives a coarse adjustment signal 226 from the computer 400 to adjust the reference frequency $f_{ref}$. The PLL 222 then provides a modulation signal 225 with a modulation frequency ($f_m$) to the optical source 206 to modulate the transmitted beam 208 at the modulation frequency $f_m$. The modulation frequency $f_m$ of the modulation signal 225 from the PLL 222 is equal to N times the reference frequency $f_{ref}$.

The modulation frequency $f_m$ preferably ranges from 100 MHz to 200 MHz. This frequency range is sufficiently high to provide good resolution at the receiver 204 while being sufficiently low so as not to require expensive and exotic electronics. In addition, this frequency range is practical in that some targets are excellent reflectors and may reflect the transmitted beam 208 in such a way which could remodulate the laser diode (discussed below) of the optical source 206; this remodulation is less likely to occur in the 100 MHz to 200 MHz range.

The modulation signal 225 also has a wavelength ($\lambda_m$). As known, the relationship between frequency and wavelength of a wave is that the velocity (v) of the wave equals the product of the frequency ($f$) and the wavelength ($\lambda$), that is, velocity $v=\lambda f$. Thus, with velocity being essentially constant, if frequency increases, then wavelength decreases. Accordingly, adjusting the frequency $f_m$ of the modulated signal 225 (and, thus, of the transmitted beam 206) also complementarily adjusts the wavelength $\lambda_m$ of the transmitted beam 206. According to the present invention, the wavelength $\lambda_m$ of the transmitted beam 208 is adjusted (by adjusting the modulation frequency $f_m$) to precisely fit the distance d between the optical source 206 and the target 12, which will be discussed in more detail below.

It is preferable for the necessary frequency adjustments, fine and coarse tuning, and other variables for the system 200 to be input from the computer 400. In addition, the computer 400 also reads data from the system 200, specifically from the processing circuitry 228. The computer 400 may be a personal computer, laptop computer, and so on. The computer 400 may also be connected to environmental sensors 402 for reading temperature, humidity, atmospheric pressure, and other environmental conditions which may affect the velocity of the transmitted and reflected beams 208 and 212 and, thus, affect the calculation of distance d. Alternatively, these environmental variables may also be input into the computer 400 manually by the user.

Through the fine and coarse signals 224 and 226, the computer 400 instructs the reference frequency generator 220 and the PLL 222 to produce the modulation frequency $f_m$. The computer 400 then monitors the phase of the reflected beam 212, preferably with a resolution of a fraction of a picosecond. The computer 400 varies the modulation frequency $f_m$ of the transmitted beam 208 until a zero phase balance is achieved in the reflected beam 212. The computer 400 is then able to calculate distance d, preferably from software accessible by the computer. A nominal value for the modulation frequency $f_m$ of transmitted beam 208 may be selected and adjusted as desired; for example, a nominal modulation frequency ($f_{m0}$) may be selected to be about 100 MHz and adjustable from about 50 MHz to about 200 MHz, which will be discussed in more detail below. The receiver 204 also includes a phase-lock loop 228 with a divide-by-(N+1) counter 229 connected to coarse adjustment signal 226.

The processing circuitry 218 includes phase-detection circuitry 230 and an analog-to-digital (A/D) converter 232. The phase-detection circuitry 230 receives a difference signal 233 from the target sensor 210 indicative of the reflected signal 212 and receives the reference frequency $f_{ref}$ from the frequency generator 220. The phase-detection circuitry 230 provides an analog phase-detector output 234 to the A/D converter 232 for conversion to a digital output signal 236 provided to the computer 400.

A detailed preferred embodiment of the distance-measuring system 200 is shown in FIG. 6. A digital-to-analog converter (DAC) 250 converts the eight-bit digital fine adjustment signal 224 from the computer 400 to a proportional current which is then converted to a voltage by an internal buffer amplifier. The voltage output of the DAC 250 is provided to a voltage-controlled crystal oscillator (VCXO) 252. The VCXO 252 preferably includes a 27 MHz crystal oscillator which outputs a 432 kHz signal after binary division. The 432 kHz output of the VCXO 252 is then divided by a flip-flop 254 connected as a two-bit Greycode counter. As such, divide-by-four action occurs in a Greycode sequence. Each flip-flop 256, 258 is on for two cycles and then changes state, and the cycling of one flip-flop is offset from the other by one count. Such a configuration produces two signals $Q_0$ and $Q_1$ which are offset by 90°. By reversing the Q and not-Q outputs of a flip-flop, a 90° signal becomes a 270° signal, and a 0° signal becomes a 180° signal. Accordingly, four fixed-phase signals are generated with respect to a full 100 kHz cycle. This configuration of flip-flops 256, 258 is also known as a quadrature counter. Signal $Q_0$ is provided to PLL 222 and PLL 228 of the transmitter.

PLL 222 includes a phase comparitor 260 with an input for receiving signal $Q_0$ and an output connected to a filter 262 which, in turn, is connected to a voltage-controlled oscillator (VCO) 264. A feedback loop of the PLL 222 is defined by an output of VCO 264 and a pair of six-bit counters 266, 268. The counters 266, 268 receive the eight-bit coarse signals 226 from the computer 400. VCO 264 outputs the modulation signal 225 to the optical source 206, which is preferably comprised of a laser driver 270 which drives a laser diode 272. A heat pump 273 may be provided for thermal stabilization of the laser diode 272, which is preferably on the order of less than 20 mW. The modulation frequency $f_m$ of the modulation signal 225 is adjustable by a factor N of the counters 266, 268, as mentioned above. More specifically, the modulation frequency $f_m$ is the product of the reference frequency $f_{ref}$ and the integer N (i.e., $f_m = N \times f_{ref}$).

The phase comparitor 260 is driven by two separate signals: the 100 kHz reference signal $Q_0$ and the feedback signal from the divide-by-N counters 266, 268. N is determined by the coarse signals 226 from the computer 400. The signals 226 are preferably 12 bits (e.g., $D_0$–$D_7$ and $D_8$–$D_{15}$) which are set up to latch the count N in PLL 222. Therefore, the modulation signal 225 will be N times the reference signal $Q_0$, as mentioned above. N is typically on the order of 1,000 to 2,000. Accordingly, with an exemplary reference frequency $f_{ref}$ of 100 kHz and an N of 1,000, the modulation frequency $f_m$ is then on the order of 100 MHz. The phase comparitor 260 varies voltage to bring frequency and the phase of the output of the counters 266, 268 into substantially exact alignment with the reference signal $Q_0$. The alignment of the signals is better than about one nanosecond.

In adjusting the modulation frequency $f_m$, the computer 400 adjusts N incrementally with the coarse signals 226, with each increment of N varying the modulation frequency $f_m$ by approximately 200 kHz. Once the modulation frequency $f_m$ is within 200 kHz of the desired operating frequency, the computer 400 tunes the reference frequency $f_{ref}$ with the fine signal 224. Very small variations in the reference frequency $f_{ref}$ result in small changes in the modulation frequency $f_m$.

Turning attention to the receiver 204, a configuration of a phase comparitor 280, a filter 282, a voltage-controlled oscillator (VCO) 284, and a pair of counters 286, 288 analogous to that of the transmitter 202 is provided. The phase comparitor 280 also receives the reference signal $Q_0$ as an input. However, rather than being adjustable by a factor N, the reference signal $Q_0$ is adjustable by a factor N+1, so that the VCO 284 provides an output signal 289 of $(N+1) \times f_{ref}$. To do this, $D_0$ of the coarse signal 226 is strapped low in PLL 222 of the transmitter 202, while $D_0$ is strapped high in PLL 228 of the receiver 204, with both D0 disconnected from computer control. As such, output signal 289 of VCO 284 has a frequency 100 kHz greater than the modulation signal 225 of the transmitter 202.

The output signal 289 is provided to an avalanche photodiode (APD) bias network 290 coupled with an avalanche photodiode (APD) 292 of the target sensor 210. Incidentally, the transmitter and the receiver optics 214 and 216 may be in the form of lenses, and may include filters and/or shielding devices for eliminating optical interference from the operating environment. The output signal 289 of the VCO 284 is a small AC voltage imposed on a DC bias applied to the APD 292. The APD 292 converts the reflected signal 212 to a current and amplifies the current, which is known as avalanche multiplication. By modulating the voltage across the APD 292 with the output signal 289, the reflected signal 212 is multiplied by a gain that varies with the output signal 289. Accordingly, the modulation signal 225 is multiplied by the output signal 289, which is known as mixing. The mixing results in a difference signal 233 with respect to the frequencies of the operating signals 225 and 289 of the PLLs 222 and 228. In this case, the difference signal 233 equals $[(N+1) \times f_{ref}]$ minus $[N \times f_{ref}]$, which is equal to $f_{ref}$ itself (along with other mixer products) and is on the order of 100 kHz in the exemplary embodiment. The difference signal 233 from the APD bias network 290 is amplified and filtered with a narrow band filter (on the order of $f_{ref}$) to remove the unwanted mixer products, and is then provided to the phase detector 230.

With additional reference to FIG. 7, a preferred embodiment of the processing circuitry 218 includes the phase-detection circuitry 230 and the A/D converter 232. The phase-detection circuitry 230 is configured as four balanced modulators 300a–d. Each of the modulators 300 is preferably an MC1496 Gilbert cell. The inputs of the modulators 300a–d are the difference signal 233 and reference signals $Q_0$ and $Q_1$ from the frequency generator 220. The four modulators 300a–d use the four phases (i.e., 0°, 90°, 180°, and 270°) of the reference signals $Q_0$ and $Q_1$ as multipliers. The four outputs of the modulators 300 are provided to a plurality of amplifiers 302a–f. The outputs 234 of the amplifiers 302 are then provided to the A/D converter 232. In addition to the 0°, 90°, 180°, and 270° phase outputs 234, one output representing 0° to 180° and one output representing 90° to 270° are provided. These two difference signals achieve an additional degree of symmetry in the balance of the balanced modulator system 230. Any of the phase outputs may be used to detect a zero-phase condition of the reflected signal 212.

Figure 8:
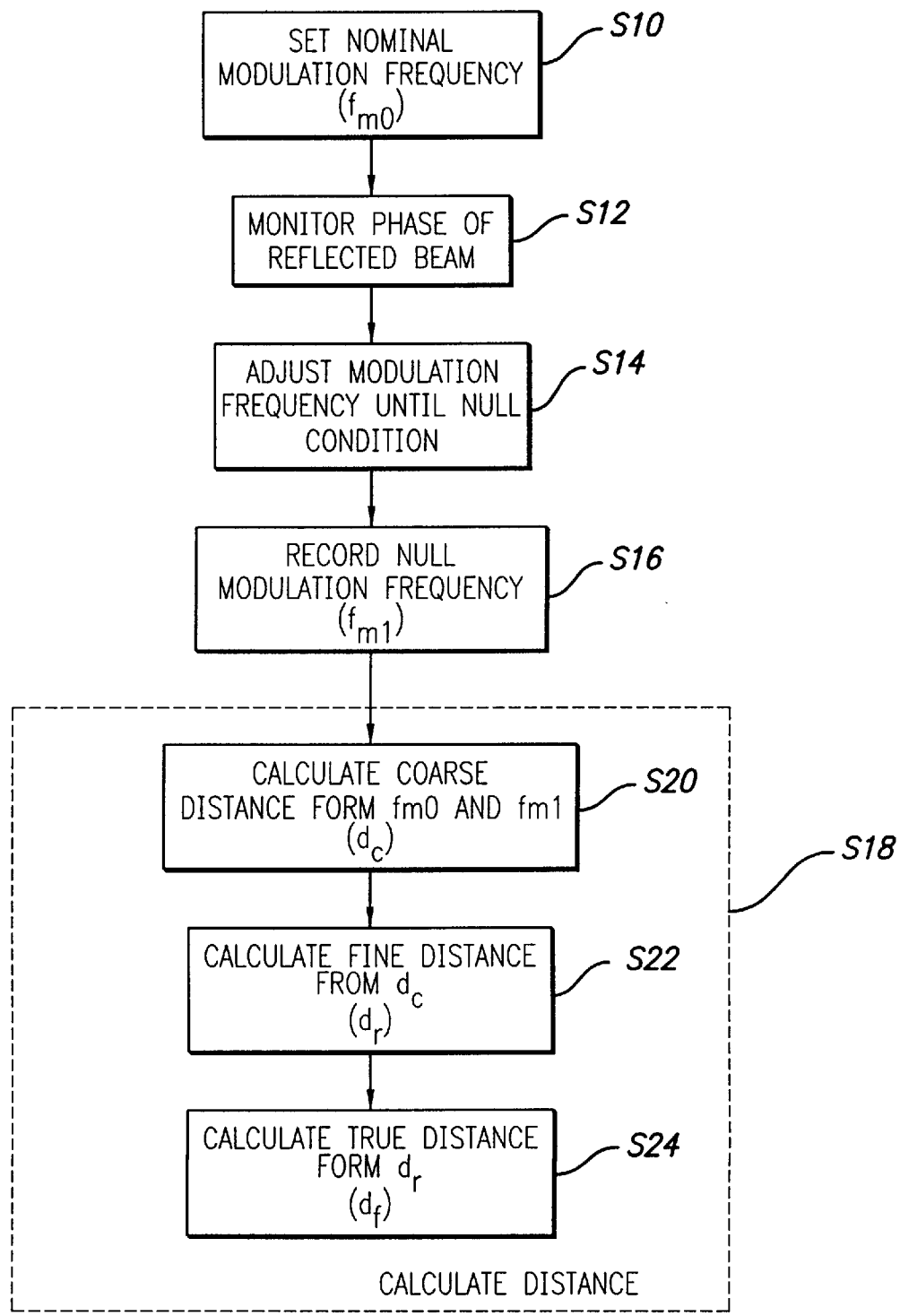
FIG. 8 is a flow chart illustrating step of exemplary methodology for measuring distance according to the present invention.
Figure 9:
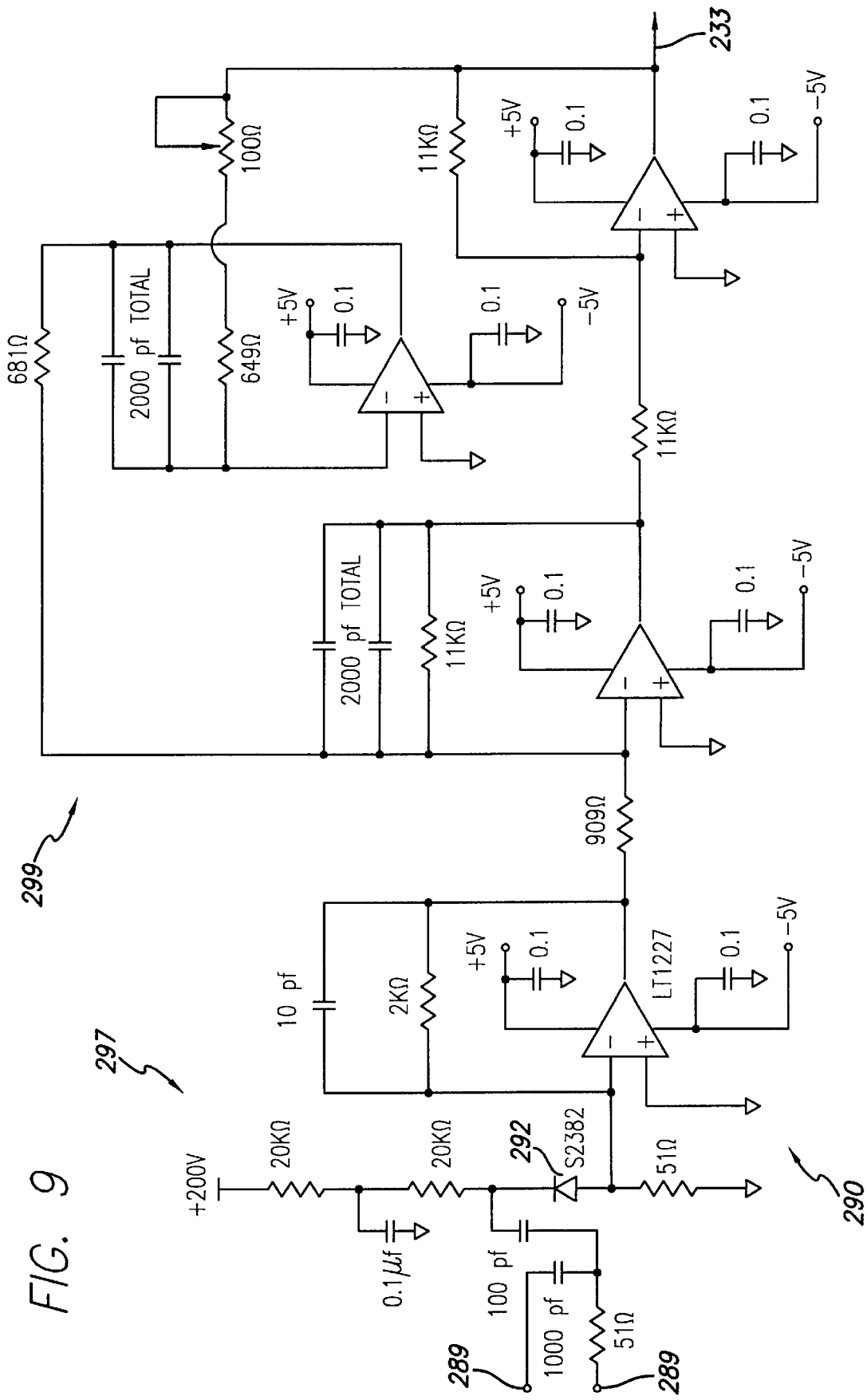
FIG. 9 is a schematic diagram of a preferred embodiment of photo diode driver and mixer circuitry of the present invention.

With additional reference to FIGS. 8 and 9, in operation the computer 400 sets and records the nominal reference frequency $f_{m0}$ (step S10). The reference frequency $f_{ref}$ of the difference signal 233 is monitored by the four modulators 300a–d to sense the nearest fixed 90°-phase condition of the reference frequency $f_{ref}$ (step S12). A 0° phase condition represents a detection of exactly a whole wavelength difference (or multiple) between the transmitted beam 208 and the reflected beam 212; a 90° phase condition represents a quarter wavelength difference plus whole wavelength; a 180° phase condition represents a half wavelength difference plus one or more whole wavelength; and a 270° phase condition represents a three-quarter wavelength difference plus whole wavelengths(s). Each of the outputs 234 is a voltage level that is digitized by the A/D converter 232 and compared to the desired condition of 0 volts, or null, in the computer 400. If a null is not found, the computer 400 adjusts the modulation frequency $f_m$ with the coarse and/or fine adjustment signals 224, 226 until a quarter-wavelength difference or null condition exists (step S14). The modulating frequency $f_m$ which produces the null condition is then read and/or recorded by a read out 275 or the computer 400 (step S16), which null modulation frequency is represented by $f_{m1}$. From the nominal modulation frequency $f_{m0}$ and the null modulation frequency $f_{m1}$, distance d to the target 12 may be calculated (step S18), which will be discussed below.

With additional reference to FIG. 9, a preferred embodiment of APD bias network circuitry 290 is illustrated. The APD circuitry 290 includes a buffer amplifier 297 and a biquad bandpass filter 299. In operation, the voltage applied to the APD 292 will rise toward the 200 volt reference by virtue of the current through the two 20 kΩ resistors. This self-biasing feature avoids the necessity of monitoring diode voltage and avoids including complex feedback bias circuitry. The voltage on the APD 292 seeks a DC level according to the amount of light (from the reflected beam 212) that is incident on the APD 292. As less light is incident, the photocurrent in the APD 292 will decrease, and the voltage drop across the two 20 kΩ resistors will start to decrease. The smaller the drop across the two 20 kΩ resistors indicates that the voltage across the APD 292 will rise, which raises the APD amplification of the photocurrent. The increasing amplification minimizes the change in the current through the two 20 kΩ resistors until the amplified signal provides enough current to stop the voltage from rising. In addition to the DC voltage from the 20-volt reference, a connection from PLL 228 carries the high-frequency (100 MHz) signal 289 to the cathode of the APD 292. By applying the high-frequency voltage to the high side of the APD 292, the low side signal taken off of the 51 Ω resistor is isolated from the high-frequency signal 289 by the relatively low capacitance of the APD 292. This reduces the amplitude of the high-frequency signal 289 that the buffer amplifier 297 must deal with.

Figure 10:
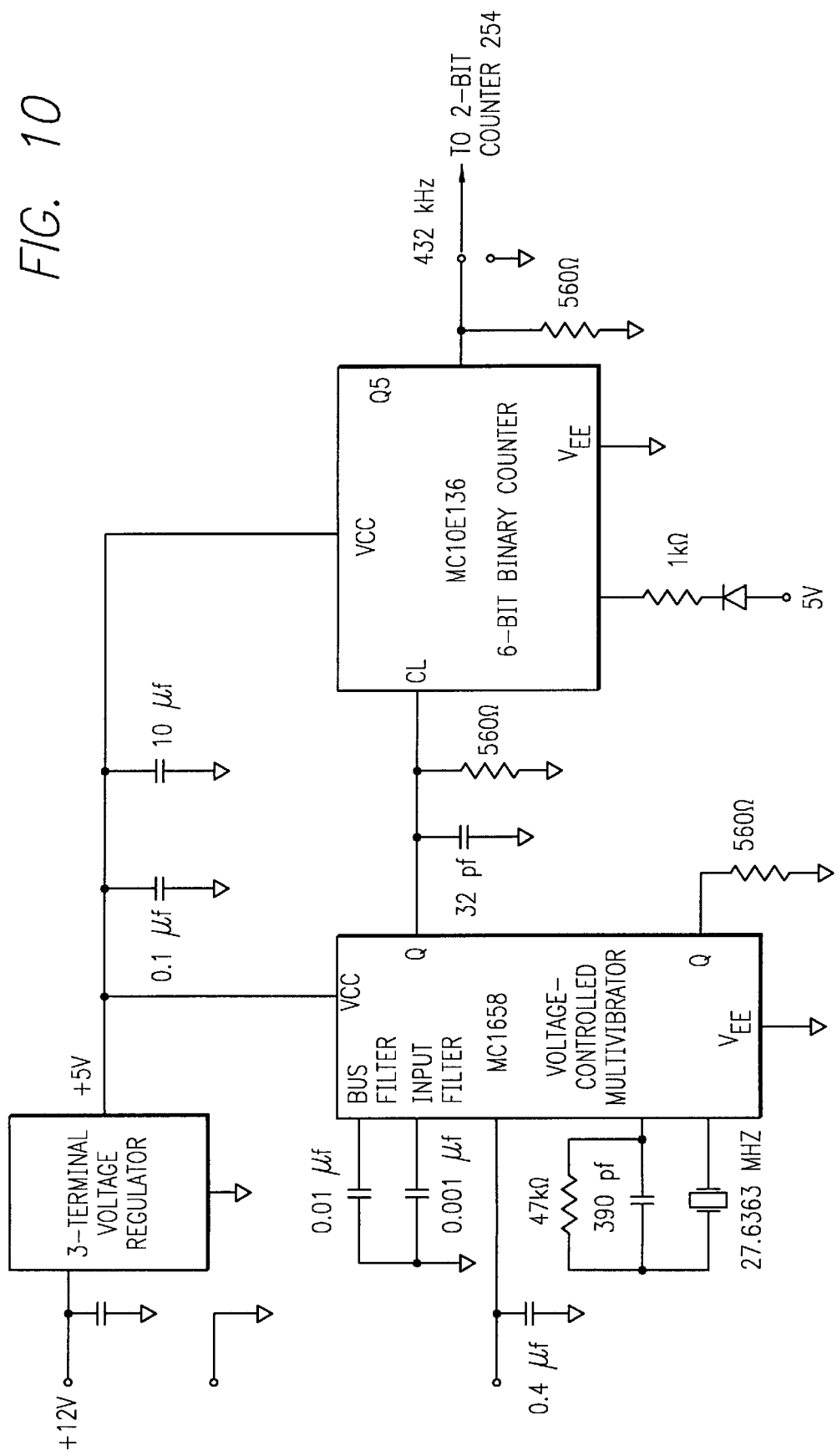
FIG. 10 is a schematic diagram of a preferred embodiment of a pulled crystal clock of the present invention.
Figure 11:
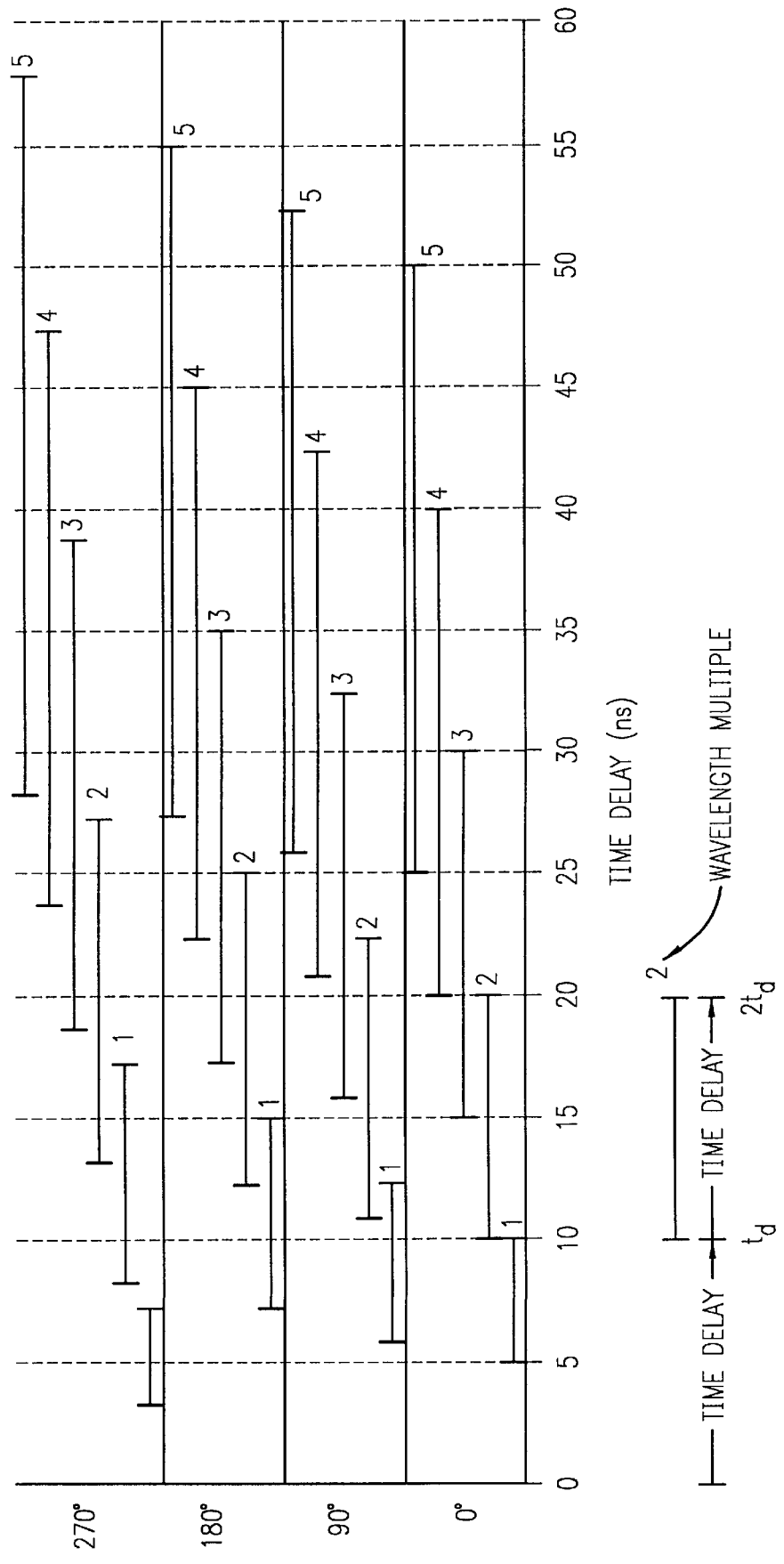
FIG. 11 is a graph illustrating phase detection principles of the present invention.

FIG. 10 illustrates a preferred embodiment of the pulled crystal clock or voltage controlled crystal oscillator 252 of the frequency generator 220.

Distance Measuring Calculations

The distance d to the target 12 may be calculated by multiplying the speed of light (c) by the time it takes transmitted beam 208 to travel to the target (or, because of the coaxial configuration of the optics, the time it takes received beam 212 to travel from the target). This time is represented by $t_t$. This may be summarized by the following Equation 1:

$$d = c \times t_t \qquad (1)$$

As the speed of light is known (and varies slightly according to the ambient conditions which are measured by the environmental sensors 402), only the time to target (or time from target) $t_t$ needs to be determined. However, there are time delays which may affect the accuracy of the calculation of distance d. Accordingly, each such time delay of the system 200 is isolated. It is then determined whether each individual time delay contributes to the total delay and accuracy of the calculation. TABLE I which follows lists exemplary individual time delays:

TABLE I

| Delay | Variable | Description |
| --- | --- | --- |
| Electronic Delay 1 | Ed1 | synth. 220 → PLL 222 → optical source 206 |
| Electronic Delay 2 | Ed2 | synth. 220 → PLL 228 → sensor 210 |
| Electronic Delay 3 | Ed3 | sensor 210 → processing circuitry 218 |
| Electronic Delay 4 | Ed4 | synth. 220 → processing circuitry 218 |
| Electronic Delay 5 | Ed5 | Phase shift of processing circuitry 218 |
| Optical Delay 1 | Od1 | time to target + zero offset 1 |
| Optical Delay 2 | Od2 | time from target + zero offset 2 |

The total time delay ($t_{total}$) may then be computed as follows:

$$t_{total} = (Ed2 - Ed1) + (Ed4 - Ed3) + Ed5 + Od1 + Od2$$

All of the electronic delays Ed1–Ed5 may be assumed to be constant and represent a constant time delay ($T_d$) (although these electronic delays may vary with, for example, temperature, which will be discussed below). The two optical delays Od1, Od2 are variable (depending upon the distance d to the target) and may be assumed to be substantially equal (because of the coaxial arrangement of the system). The optical delays Od1, Od2 may be added together to represent a variable time delay ($t_d$). Therefore, the above equation becomes:

$$t_{total} = \text{variable time delay } (t_d) + \text{constant time delay } (T_d)$$

$$t_{total} = t_d + T_d$$

This equation may be rewritten as follows:

$$t_d = t_{total} - T_d \qquad (2)$$

which will be discuss in more detail below.

With additional reference to FIG. A time delay is measured when measuring a null modulation frequency which produces a 0° phase difference which may be represented by:

$$\text{time delay} = N \times (1/f_0) \quad (3)$$

where N is an integer and $f_0$ is the 0° phase-producing modulation frequency. And a coarse distance $d_c$ corresponding to this time delay may be determined by (step S20):

$$d_c = N \times (c/f_0) \div 2 \quad (4)$$

Although N may be unknown, the above equation shows that the time delay (and, accordingly, the coarse distance) is a multiple of $1/f_0$. In addition, when a 90° phase difference (i.e., a quarter-wavelength difference) is measured, the time delay is:

$$\text{time delay} = (K + \tfrac{1}{4}) \times (1/f_{90}) \quad (5)$$

Likewise, for a 180° phase difference (i.e., a half-wavelength difference), the time delay is:

$$\text{time delay} = (M + \tfrac{1}{2}) \times (1/f_{180})$$

And for a 270° phase difference (i.e., a three-quarter-wavelength difference), the time delay is:

$$\text{time delay} = (L + \tfrac{3}{4}) \times (1/f_{270})$$

In these equations, K, M, and L are integers. Equations 3 and 5 may be equated:

$$N \times (1/f_0) = (K + \tfrac{1}{4}) \times (1/f_{90})$$

which yields the following equation:

$$(f_{90}/f_0) = (K + \tfrac{1}{4})/N \quad (6)$$

The remaining equations may be equated similarly to yield:

$$(f_{180}/f_0) = (M + \tfrac{1}{2})/N$$

$$(f_{270}/f_0) = (L + \tfrac{3}{4})/N$$

$$(f_{180}/f_{90}) = (M + \tfrac{1}{2})/(K + \tfrac{1}{4})$$

$$(f_{270}/f_{90}) = (L + \tfrac{3}{4})/(K + \tfrac{1}{4})$$

$$(f_{270}/f_{180}) = (L + \tfrac{3}{4})/(M + \tfrac{1}{2})$$

To calculate the total delay, N can be solved for in the previous six equations. After solving for N, the total delay $t_{total}$ may be calculated, from which the time to target $t_t$ may be solved by the following:

$$\text{time to target} = (\text{total delay} - \text{constant delay})/2$$

$$t_t = (t_{total} - Td)/2 \quad (7)$$

After solving for time to target $t_t$, a fine distance $d_f$ may be determined (step S22) with the following equation:

$$d_f = t_t \times c$$

From the fine distance $d_f$, a true distance $d_t$ may be determined after compensating for environmental variables such as temperature, pressure, and so on (step S24).

Sample Calculation

For example, assume that the frequencies for 0° and 90° phase angles $f_0$, $f_{90}$ were determined to be the following values:

$$f_0 = 137.620850 \text{ MHz}$$

$$f_{90} = 144.105000 \text{ MHz}$$

Accordingly, $$f_0/f_{90} = 1.047116116$$

From Equation 5 above, the following relationship is determined:

$$f_0/f_{90} = (K + \tfrac{1}{4})/N = 1.047116116$$

Next, integer values for K and N need to be determined which yield a value most approximate to 1.047116116. TABLE II tabulates values for a set of values of K and N. Note that only values between 0.5 and 2.0 are valid ratios.

TABLE II

| K\N | 3 | 4 | 5 | 6 | 7 |
|---|---|---|---|---|---|
| 3 | 1.08333 | 0.821 | <0.5 | <0.5 | <0.5 |
| 4 | 1.41667 | 1.0625 | 0.85 | <0.5 | <0.5 |
| 5 | 1.75 | 1.3125 | 1.05 | 0.875 | <0.5 |
| 6 | >2.0 | 1.5625 | 1.25 | 1.0416 | 0.8929 |
| 7 | >2.0 | >2.0 | >2.0 | >2.0 | 1.0357 |

As can be seen in TABLE II, when K=5 and N=5, the ratio $(K + \tfrac{1}{4})/N = 1.05$ which most approximates the exact ratio of $f_0/f_{90}$. Assuming a vacuum, the speed of light, c, equals 299,792,458 meters per second. Then, from Equation 4 above, coarse distance $d_c$ may be calculated as:

$$d_c = N \times (c/f_0) \div 2$$

$$d_c = 5 \times (299,792,458/137,620,850) \div 2$$

$$d_c = 5.445987 \text{ meters}$$

Figure 12:
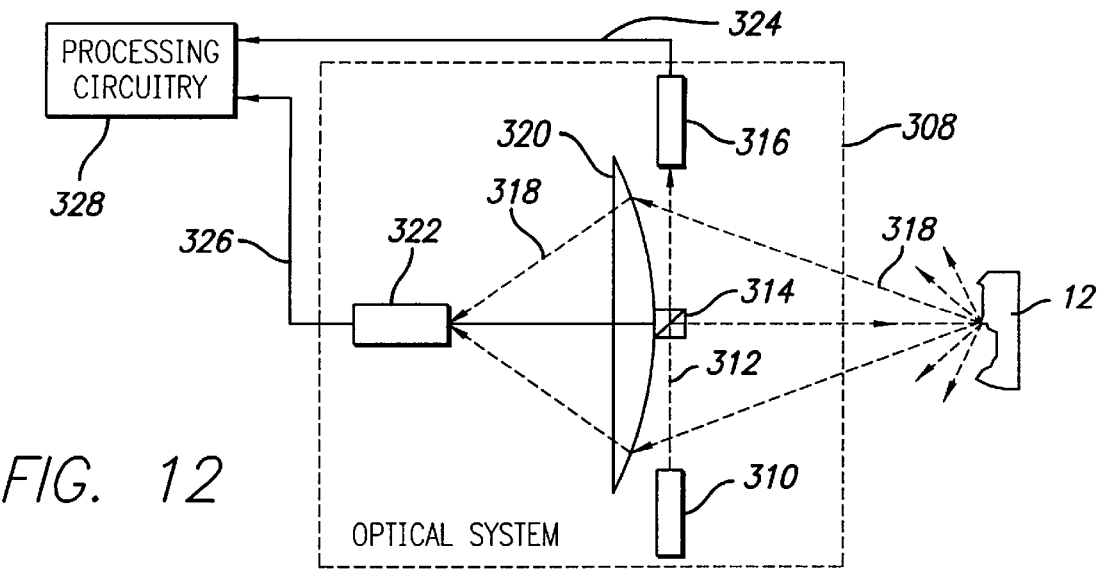
FIG. 12 is a schematic diagram of another exemplary embodiment of distance-measuring apparatus of the invention.

With additional reference to FIG. 12, an alternative configuration of an optical system 308 of the present invention is shown. An optical source 310 provides a transmitted beam 312 which is split by a beam splitter 314 so that portions of transmitted beam 312 are incident on the target 12 and on a reference sensor 316. Reflected beam 318 is collected by a lens 320 and focused on a target sensor 322. Reference sensor 316 and target sensor 322 respectively provide a reference signal 324 and a target signal 326 to processing circuitry 328 for use in calculating the distance to the target analogous to that described above. The optical system 308 is preferably a self-contained portable unit which may be positioned as desired by a user. A plurality of the optical systems 308 may be provided for a single digitizing installation for fast data generation and collection for large targets. For example, a room may have four or six of the optical systems 308 spaced throughout for digitizing an aircraft wing in a matter of seconds rather than hours or days as is the case with conventional apparatus. Alternatively, the portable optical system 308 may be integrated into manufacturing processes as one tool in the tool library of a computerized numerically controlled (CNC) milling machine. Such integration would allow manufacturers to certify parts without removing the parts from the bed of the machine, thereby significantly increasing the speed of the manufacturing process.

Figure 13:
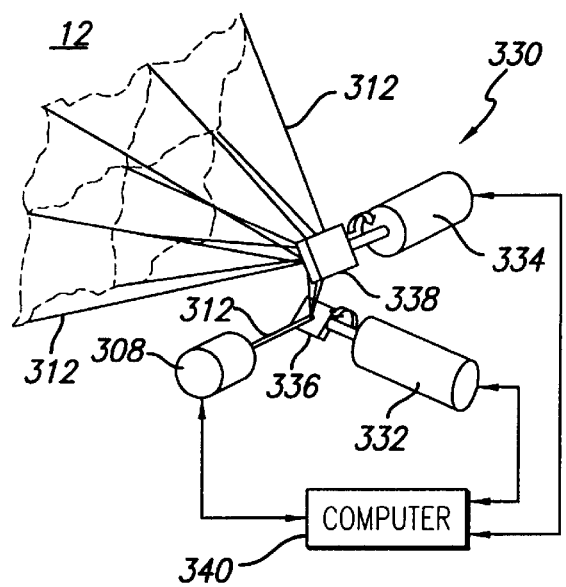
FIG. 13 is a schematic diagram illustrating an exemplary embodiment of a two-mirror scanning apparatus of the present invention.
Figure 14:
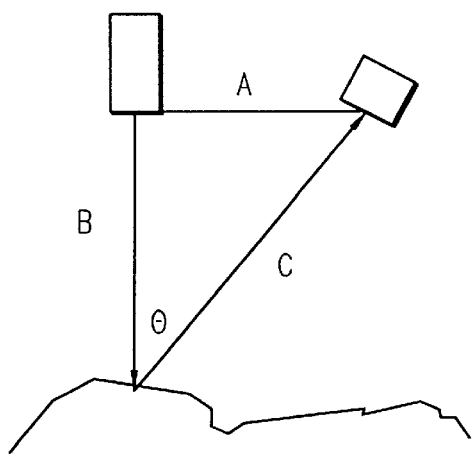
FIG. 14 is a schematic diagram illustrating conventional triangulation techniques.

With additional reference to FIG. 13, to further increase the speed of the present invention, an two-axis optical apparatus 330 for articulating transmitted beam 312 is provided. The optical apparatus 330 includes an x-axis articulation unit 332 and a y-axis articulation unit 334, each of which includes a respective rotatable mirror 336 and 338. The optical apparatus 330 "steers" transmitted beam 312 to desired locations on the target 12. Transmitted beam 312 may be scanned or "rastered" across the surface of the target 12 under control of a computer 340 to generate and collect data in calculating the distance to the target. The reflected beams are preferably collected coaxially through use of mirrors 336 and 338. By implementing such an optical apparatus 330, large amounts of data may be generated and collected in a very short period of time. The collected data may then be used in digitizing the target 12 by the computer 400 or other analysis system.

Those skilled in the art will understand that the embodiments of the present invention described above exemplify the principles of the invention and do not limit the scope of the invention to those preferred embodiments specifically shown and described. The exemplary embodiments provide a foundation from which numerous alternatives and modifications may be made, which alternatives and modifications are also within the scope of the present invention as defined in the appended claims.

What is claimed is:

1. Apparatus for measuring distance to a target, the apparatus comprising:

an adjustable frequency generator for generating a modulation frequency;

a light source connected to said frequency generator for transmitting a transmitted beam of light to the target at said modulation frequency;

a target sensor for receiving a reflected beam reflected from the target, said reflected beam having a reflected frequency;

a phase detector connected to said frequency generator and said target sensor for receiving said modulation frequency and said reflected frequency and for providing an output indicative of a phase angle between said modulation frequency and said reflected frequency; and a computer connected to said phase detector and said frequency generator, said computer for adjusting said modulation frequency to a first frequency that produces a zero phase difference between said modulation frequency and said reflected frequency, for adjusting said modulation frequency to a second frequency that produces a pre-determined non-zero phase difference between said modulation frequency and said reflected frequency, and for calculating said distance to said target from said first and second frequencies.

2. The apparatus of claim 1 wherein said non-zero phase difference is a respective multiple of 90 degrees.

3. The apparatus of claim 1 wherein said transmitted beam and said reflected beam are substantially coaxial.

4. The apparatus of claim 1 wherein said target sensor includes:

a bias network connected to said frequency generator and said phase detector; and an avalanche photodiode connected to said bias network for receiving said reflected beam;

said bias network for mixing said modulation frequency with said reflected frequency to produce a difference frequency and for providing said difference frequency to said phase detector.

5. A method for measuring distance to a target comprising the steps of:

generating an adjustable modulation frequency;

transmitting a transmitted beam at said modulation frequency to the target;

receiving a reflected beam with a reflected frequency from the target;

monitoring said reflected frequency to determine a phase difference between said modulation frequency and said reflected frequency; and adjusting said modulation frequency to a first frequency that produces a zero phase difference between said modulation frequency and said reflected frequency;

adjusting said modulation frequency to a second frequency that produces a pre-determined non-zero phase difference between said modulation frequency and said reflected frequency; and calculating distance to the target based on said first and second frequencies.

6. The method of claim 5 wherein said receiving step comprising the step of:

receiving said reflected beam in a substantially coaxial relationship with said transmitted beam.

7. The method of claim 5 wherein said non-zero phase difference is a respective multiple of 90 degrees.

8. Apparatus for measuring distance to a target, the apparatus comprising:

an adjustable frequency generator for generating a modulation frequency;

a light source connected to said frequency generator for transmitting a transmitted beam of light to the target at said modulation frequency;

a target sensor for receiving a reflected beam reflected from the target, said reflected beam having a reflected frequency;

a phase detector connected to said frequency generator and said target sensor for receiving said modulation frequency and said reflected frequency and for providing an output indicative of a phase angle between said modulation frequency and said reflected frequency; and a computer connected to said phase detector and said frequency generator, said computer for adjusting said modulation frequency to a first frequency that produces a first predetermined non-zero phase difference between said modulation frequency and said reflected frequency, for adjusting said modulation frequency to a second frequency that produces a second predetermined non-zero phase difference between said modulation frequency and said reflected frequency, and for calculating said distance to said target from said first and second frequencies.

9. The apparatus of claim 8 wherein said first and second non-zero phase differences are respective multiples of 90 degrees.

10. A method for measuring distance to a target comprising the steps of:

generating an adjustable modulation frequency;

transmitting a transmitted beam at said modulation frequency to the target;

receiving a reflected beam with a reflected frequency from the target;

monitoring said reflected frequency to determine a phase difference between said modulation frequency and said reflected frequency; and adjusting said modulation frequency to a first frequency that produces a first pre-determined non-zero phase difference between said modulation frequency and said reflected frequency;

adjusting said modulation frequency to a second frequency that produces a second pre-determined non-zero phase difference between said modulation frequency and said reflected frequency; and calculating distance to the target based on said first and second frequencies.

11. The apparatus of claim 10 wherein said first and second non-zero phase differences are respective multiples of 90 degrees.

* * * * *